United States Patent
Krivopaltsev et al.

(10) Patent No.: US 10,108,879 B2
(45) Date of Patent: Oct. 23, 2018

(54) AGGREGATE TRAINING DATA SET GENERATION FOR OCR PROCESSING

(71) Applicant: INTUIT INC., Mountain View, CA (US)

(72) Inventors: Eugene Krivopaltsev, Mountain View, CA (US); Sreeneel K. Maddika, Mountain View, CA (US); Vijay S. Yellapragada, Mountain View, CA (US)

(73) Assignee: Intuit inc., Mountain View, CA (US)

( * ) Notice: Subject to any disclaimer, the term of this patent is extended or adjusted under 35 U.S.C. 154(b) by 0 days.

(21) Appl. No.: 15/271,562

(22) Filed: Sep. 21, 2016

(65) Prior Publication Data

US 2018/0082146 A1  Mar. 22, 2018

(51) Int. Cl.
*G06K 9/00* (2006.01)
*G06K 9/46* (2006.01)

(52) U.S. Cl.
CPC ....... *G06K 9/4671* (2013.01); *G06K 9/00442* (2013.01)

(58) Field of Classification Search
CPC .......................... G06K 9/4671; G06K 9/00442
See application file for complete search history.

(56) References Cited

U.S. PATENT DOCUMENTS

| | | | |
|---|---|---|---|
| 2009/0263019 A1* | 10/2009 | Tzadok | G06K 9/00852 382/176 |
| 2010/0023511 A1* | 1/2010 | Borodziewicz | G06F 17/30675 707/E17.014 |
| 2010/0115097 A1* | 5/2010 | Gnanasambandam | G06F 9/5027 709/226 |
| 2010/0246963 A1* | 9/2010 | Al-Muhtaseb | G06K 9/6297 382/185 |
| 2012/0134589 A1 | 5/2012 | Reddy | |
| 2016/0307067 A1* | 10/2016 | Filimonova | G06K 9/6202 |

OTHER PUBLICATIONS

International Search Report and Written Opinion dated Dec. 6, 2016 for Application No. PCT/US2016/053007.

\* cited by examiner

*Primary Examiner* — Bhavesh M Mehta
*Assistant Examiner* — Menatoallah Youssef
(74) *Attorney, Agent, or Firm* — Patterson + Sheridan, LLP

(57) ABSTRACT

The present disclosure includes techniques for selecting a candidate presentation style for individual documents for inclusion in an aggregate training data set for a document type that may be used to train an OCR processing engine prior to identifying text in an image of a document of the document type. In one embodiment, text input corresponding to a text sample in a document is received, and an image of the text sample in the document is received. For each of a plurality of candidate presentation styles, an OCR processing engine is trained using a training data set corresponding to the given candidate presentation style, and the OCR processing engine is used, as trained, to identify text in the received image. The OCR processing results for each candidate presentation style are compared to the received text input. A candidate presentation style for the document is selected based on the comparisons.

20 Claims, 7 Drawing Sheets

| TRAINING DATA SET 110 | FONTS 412 | FONT SIZES 414 | PROCESS TIME 416 | SCORE 418 |
|---|---|---|---|---|
| 20db-24-30-1 | 20db | 24.0/30.0/1.0 | 2.04 | 713 |
| ARIAL-24 | ARIAL | 24.0/24.0/1.0 | 1.51 | 407 |
| ARIAL-24-30-1 | ARIAL | 24.0/30.0/1.0 | 1.65 | 435 |
| ARIAL-BOLD-24-30-1 | ARIAL-BOLDMT | 24.0/30.0/1.0 | 1.32 | 286 |
| AVENIRNEXT-24-30-1 | AVENIRNEXT-REGULAR | 24.0/30.0/1.0 | 1.56 | 555 |
| COCHINBOLD-24-30-1 | COCHIN-BOLD | 24.0/30.0/1.0 | 0.97 | 47 |
| COCHIN-24-30-1 | COCHIN | 24.0/30.0/1.0 | 1.06 | 86 |
| COURIER+BOLD-24-30-2 | COURIER-BOLD,COURIER | 24.0/30.0/2.0 | 1.83 | 271 |
| COURIER-16 | COURIER | 16.0/16.0/1.0 | 2.46 | 99999 |
| COURIER-16-30-1 | COURIER | 16.0/30.0/1.0 | 1.91 | 273 |
| COURIER-24 | COURIER | 24.0/24.0/1.0 | 1.95 | 278 |
| COURIER-24-30-1 | COURIER | 24.0/30.0/1.0 | 1.77 | 481 |
| COURIER-24-30-2 | COURIER | 24.0/30.0/2.0 | 1.81 | 481 |
| COURIER-MENLO-24-30-1 | MENLO-REGULAR,COURIER | 24.0/30.0/1.0 | 1.90 | 300 |
| COURIERBOLD-24-30-1 | COURIER-BOLD | 24.0/30.0/1.0 | 1.93 | 252 |
| COURIERFONTS-24-30-1 | COURIER,COURIER-BOLD,COU.. | 24.0/30.0/1.0 | 1.75 | 274 |
| COURIERNEWPSMT-24-30-1 | COURIERNEWPSMT | 24.0/30.0/1.0 | 1.84 | 507 |
| FUTURA-24-30-1 | FUTURA | 24.0/30.0/1.0 | 1.50 | 549 |
| GEORGIA-24-30-1 | GEORGIA | 24.0/30.0/1.0 | 1.14 | 92 |
| GILLSANS-24-30-1 | GILLSANS | 24.0/30.0/1.0 | 1.27 | 229 |
| HELVETICA-24-30-1 | HELVETICA | 24.0/30.0/1.0 | 1.81 | 425 |
| HELVETICABOLD-24-30-1 | HELVETICA-BOLD | 24.0/30.0/1.0 | 1.91 | 375 |
| MENLO-24-30-1 | MENLO-REGULAR | 24.0/30.0/1.0 | 1.90 | 363 |

FIG. 4

AGGREGATE TRAINING DATA SET GENERATION FOR OCR PROCESSING

BACKGROUND

Field

The present disclosure generally relates to OCR processing. More specifically, the present disclosure provides techniques for identifying a favorable text font in an image of a document to use in training an OCR processing engine.

Related Art

The accuracy of OCR processing often depends on a training data set used to initialize an OCR processing engine. For example, processing of an image having text of a particular font and size will be more accurate if a training data set created for that particular font and size is used to train the OCR processing engine than if a training data set created for other fonts or sizes is used to train the OCR processing engine.

It is possible to create an aggregate training data set that includes training data for multiple fonts of multiple sizes. However, in order to accommodate all possible fonts and sizes, such aggregate training data sets result in longer processing times and suboptimal accuracy. Creating more tailored aggregate training data sets that include only training data for the fonts and sizes used in a particular document requires identification of the fonts and sizes of text in an image of the document, which can be difficult and time consuming.

BRIEF DESCRIPTION OF THE DRAWINGS

FIG. 4 illustrates the results of a comparison between a text input associated with a text sample in a document and OCR processing results for an image of the text sample in the document using training data sets corresponding to various candidate presentation styles, according to one embodiment.

DETAILED DESCRIPTION

Figure 1:
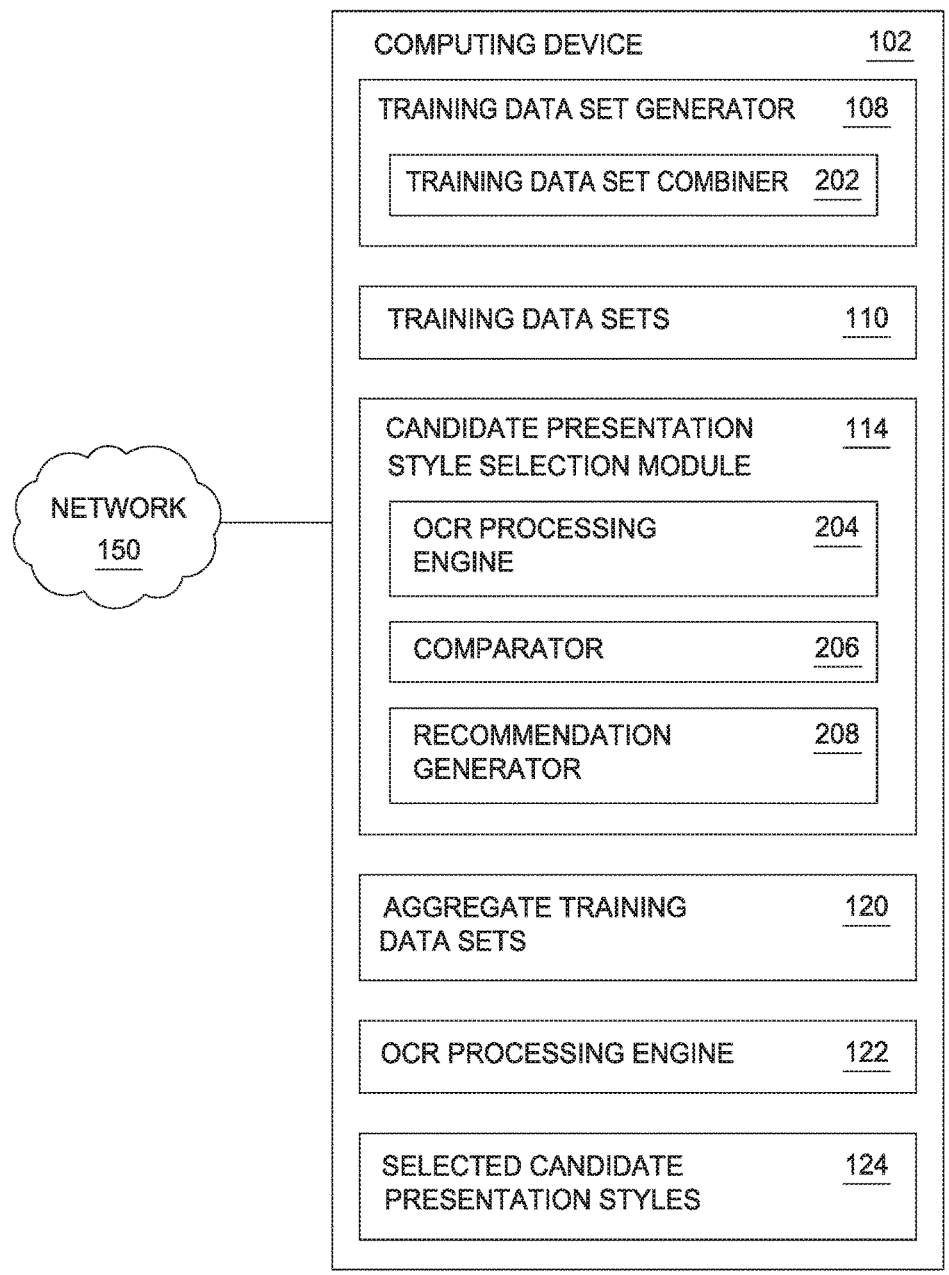
FIG. 1 illustrates an example computing environment that may be used to apply techniques of the present disclosure, according to one embodiment.

Embodiments presented herein provide techniques for creating aggregate OCR training data sets, where each set is tailored for a particular document type. The document type could identify any type of content found in the document (e.g., a type of form, a type of contract, etc.). In one embodiment, an aggregate training data set is created by combining training data sets corresponding to different candidate presentation styles. Each candidate presentation style may specify a particular text font and size combination. The candidate presentation styles included in an aggregate training data set for a particular document type are chosen by selecting a candidate presentation style for each of a plurality of documents of the particular document type. For example, the document type may be a W2 form. For a first W2 form, a first candidate presentation style may be selected. For a second W2 form, a second candidate presentation style may be selected. Thus, an aggregate training data set created for W2 forms in this example could include a first training data set associated with the first candidate presentation style and a second training data set associated with the second candidate presentation style.

Because the created aggregate training data set corresponds to the particular document type, and only includes training data sets corresponding to the candidate presentation styles selected for documents of the given document type, OCR processing of an image of a document of the document type could take less time and could produce more accurate results if the OCR processing engine were trained with the created aggregate training data set than if the OCR processing engine were trained with training data sets corresponding to all candidate presentation styles. Additionally, training the OCR processing engine with the created aggregate training data set could allow for more accurate results than if the OCR processing engine were trained with only a single training data set corresponding to a single candidate presentation style.

In one embodiment, a candidate presentation style for an individual document is selected by receiving text input corresponding to a text sample from the document and an image of the text sample. The text input provides the actual text sample from the document in a machine-readable format. The text sample may be, for example, a given number of words or lines of text found in the document. A document type associated with the document is also received. For each candidate presentation style, an OCR processing engine is trained using a training data set corresponding to the given candidate presentation style. The OCR processing engine then identifies text in the received image and produces OCR processing results. The OCR processing results are then compared to the received text input, and a score for the given candidate presentation style is calculated based on the comparison. For example, the score may be determined by calculating the Levenshtein distance between the OCR processing results and the text input. The time required to complete the OCR processing for each candidate presentation style may also be determined. The candidate presentation styles are then ranked based on the calculated times, the calculated scores, or both.

A candidate presentation style for the document is selected based on the ranking. This process may be repeated for each document in a set of documents of a given type, such that a candidate presentation style is chosen for each document in the set of documents of the given type. Further, this process may be repeated for a plurality of different sets of documents of various types (e.g., a candidate presentation style is selected for each of a plurality of documents of a first document type, a candidate presentation style is selected for each of a plurality of documents of a second document type, etc.). Aggregate training data sets may be created for each document type by aggregating training data sets corresponding to the selected candidate presentation styles for each document of the given type.

Once an aggregate training data set for a particular document type has been created, that aggregate training data set can be used whenever a document associated with that document type requires OCR processing. For example, when an image of a document of a particular type is received for OCR processing, an OCR processing engine is trained using the aggregate training data set created for that document type. The OCR processing engine is then used, as trained, to identify text in the image of the document.

FIG. 1 illustrates an example computing environment 100, according to one embodiment. As shown, the environment 100 includes a computing device 102 connected to a network 150. Computing device 102 includes training data set generator 108, training data sets 110, candidate presentation style selection module 114, aggregate training data sets 120, OCR processing engine 122, and selected candidate presentation styles 124.

The candidate presentation style selection module 114 includes OCR processing engine 204, comparator 206, and recommendation generator 208. The candidate presentation style selection module 114 selects a candidate presentation style for an individual document (e.g., identifies the candidate presentation style most frequently used in a document). To do so, the OCR processing engine 204 receives a text input corresponding to actual text in the document, an image of the actual text in the document, and a type of the document. The text input, the image, and the document type may be provided by the user using an I/O device (e.g., a scanner, a keyboard, etc.), or received at computing device 102 from another computing device or data storage connected to network 150.

The OCR processing engine 204 is trained using a plurality of training data sets 100 stored at computing device 102 before the OCR processing engine 204 is used to identify text in the received image. In one embodiment, each training data set 110 corresponds to a particular candidate presentation style (e.g., a specific font and text size). The training data sets 110 may have been generated at computing device 102 using training data set generator 108. For example, the training data set generator 108 may create training data sets 110 each tailored for a particular text font and size combination to establish a suite of possible training data sets that may be used to train an OCR engine. The OCR processing engine 204 is trained using a given training data set 110. Once trained using a given training data set 110, the OCR processing engine 204 is used to identify text in the received image of the document and to produce OCR processing results for the given training data set 100. That is, the OCR processing engine 204 evaluates the image to determine what text content is present in that image. The OCR processing engine 204 is trained, and then used to identify text in the received image and to produce OCR processing results one time for each training data set 110. In one embodiment, the OCR processing engine 204 monitors how much time is needed to identify text in the image after being trained using each training data set 110.

Once the OCR processing engine 204 identifies text in the image after being trained using each of the training data sets 110, the comparator 206 compares the text input to the results of the OCR processing for each of the training data sets 110. The comparator 206 calculates a score for each candidate presentation style based on the comparison between the text input and the OCR processing results for the given candidate presentation style. The score indicates the differences between the text input corresponding to the actual text in the document and the OCR processing results for the image of the actual text in the document. Thus, the score indicates how accurately the OCR training engine 204 identifies text in the image of the document after being trained using a given training data set 110. The recommendation generator 208 then ranks all candidate presentation styles based on the score calculated for each candidate presentation style. In addition, the recommendation generator 208 may rank the candidate presentation styles based on the time required to identify text in the image after being trained using a training data set 110 corresponding to each candidate presentation style.

The recommendation generator 208 then selects a candidate presentation style for the document based on the ranking. For example, the recommendation generator 208 may choose the candidate presentation style with the lowest score, which indicates the least number of character differences between the OCR processing results for that candidate presentation style and the text input corresponding to the actual text in the document. Or said differently, the recommendation generator 208 may select the candidate presentation style with the lowest score because the candidate presentation style with the lowest score has the most accurate OCR processing results. The candidate presentation style with the most accurate OCR processing results is likely to be the most frequently used candidate presentation style in the document. In one embodiment, the recommendation generator 208 may select more than one candidate presentation style for the document based on the rankings. The recommendation generator 208 stores the selected candidate presentation style(s) 124 for the document at computing device 102. The selected candidate presentation style(s) 124 are categorized and stored at computing device 102 according to the document type associated with the document.

The candidate presentation style selection module 114 may be used to select a candidate presentation style for each document in a library of documents sharing a common type. The training data set generator 108 includes training data set combiner 202. Training data set combiner 202 identifies a candidate presentation style selected for each document in a library of documents sharing a document type. The training data set combiner 202 may identify selected candidate presentation styles by retrieving one or more selected candidate presentation style(s) 124 corresponding to the particular document type stored at computing device 102 by recommendation generator 208.

Once the training data set combiner 202 has identified candidate presentation styles selected for the particular type of document, the training data set combiner 202 creates an aggregate training data set 120 for the particular type of document by combining training data sets 110 associated with the identified candidate presentation styles. The training data set combiner 202 then stores the created aggregate training data set 120 at computing device 102. The training data set combiner 202 may create one or more aggregate training data sets 120 for each of a plurality of document types, and as such, there may be a plurality of aggregate training data sets 120 stored at computing device 102.

The OCR processing engine 122 identifies text in an image of a document after being trained using an aggregate training data set 120 created for a document type associated with the document. When an image of a document is received for OCR processing at computing device 102 along with a document type associated with the image, the OCR processing engine 122 retrieves a stored aggregate training data set 120 corresponding to the received document type.

The OCR processing engine 122 is trained using the retrieved aggregate training data set 120, and is then used to identify text in the image of the document. The image and the document type may be input at computing device 102 by the user using any I/O device, or they may be received or retrieved at computing device 102 from another computing device or data storage connected to network 150. In one embodiment, a single OCR processing engine may perform the actions described herein with respect to the OCR processing engines 204 and 122.

Figure 2A:
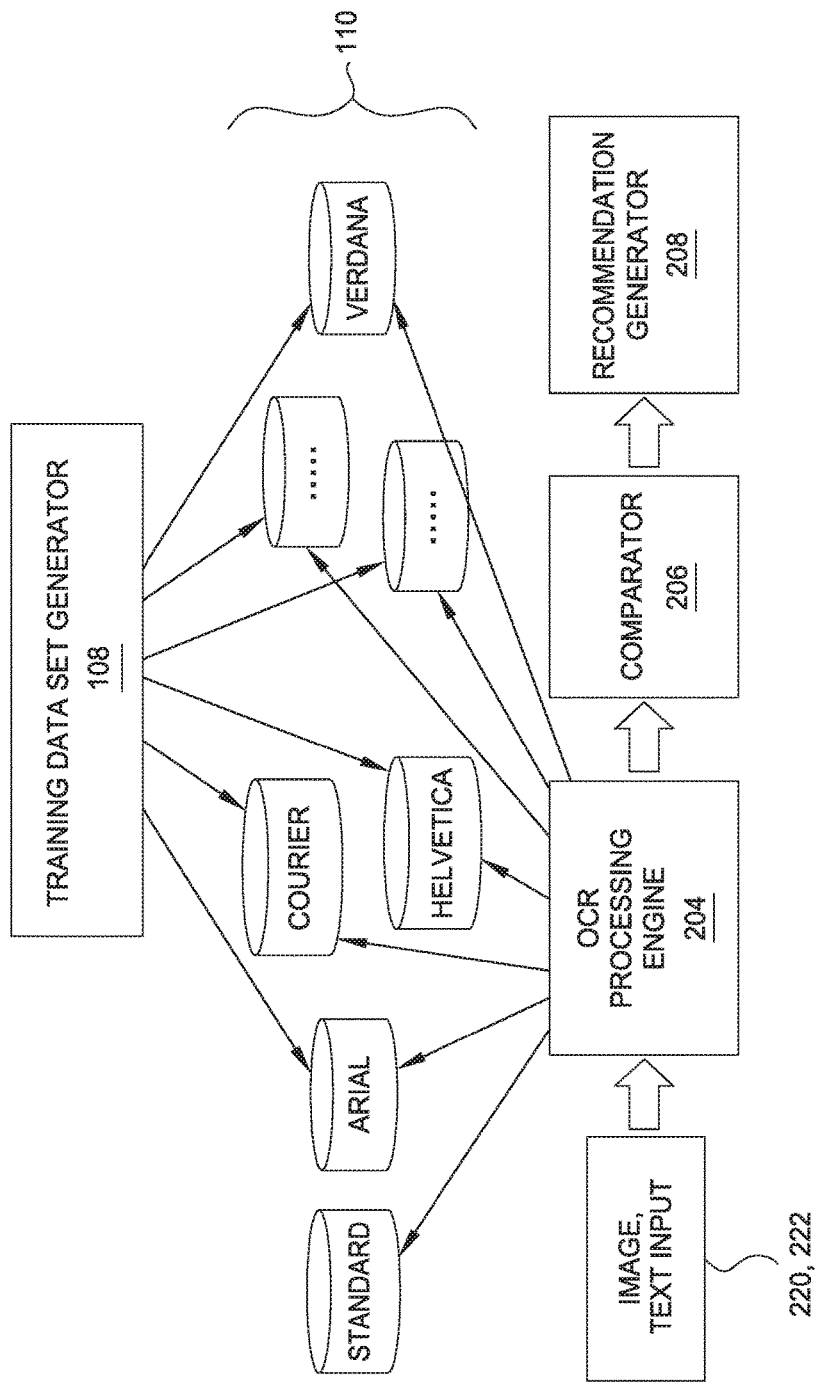
FIGS. 2A and 2B are graphical representations of elements in the example computing environment shown in FIG. 1, according to one embodiment.
Figure 2B:
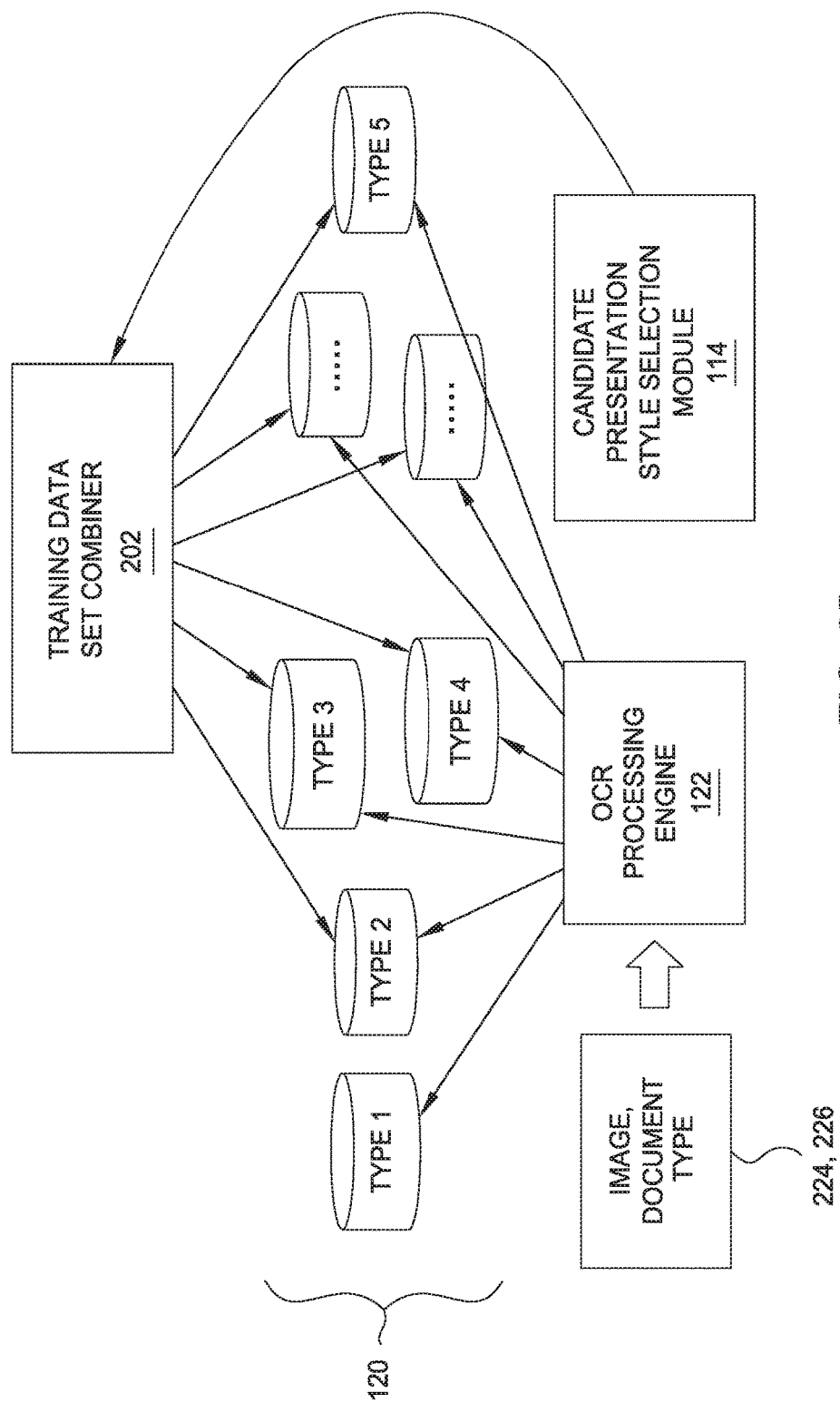

FIGS. 2A and 2B are graphical representations of elements in the example computing environment 100 shown in FIG. 1, according to one embodiment. Specifically, FIG. 2A illustrates interactions between the training data set generator 108 and the components of the candidate presentation style selection module 114 (OCR processing engine 204, comparator 206 and recommendation generator 208) to select a candidate presentation style for a document. As shown in FIG. 2A, image 220 of a text sample in a document and text input 222 corresponding to the text sample in the document are received by the OCR processing engine 204. The OCR processing engine 204 retrieves training data sets 110 corresponding to each of a plurality of candidate presentation styles, as produced by training data set generator 108. The OCR processing engine 204 identifies text in the image 220 and produces OCR processing results multiple times after being trained using a different one of the training data sets 110 each time. The OCR processing results for each candidate presentation style are received at the comparator 206. The comparator 206 compares the text input 222 to the OCR processing results for each candidate presentation style. The results of the comparison are then received at the recommendation generator 208. The recommendation generator 208 selects one or more candidate presentation styles for the document based on the results of the comparison.

FIG. 2B illustrates the interactions between the training data set combiner 202 of the training data set generator 108, the candidate presentation style selection module 114, and the OCR processing engine 122 to create and use aggregate training data sets 120. As shown in FIG. 2B, the training data set combiner 202 receives from the candidate presentation style selection module 114 the candidate presentation styles selected by the recommendation generator 208 for a plurality of documents corresponding to each of a plurality of document types. With the retrieved selected candidate presentation styles, the training data set combiner 202 creates aggregate training data sets 120, each associated with a different document type.

When the OCR processing engine 122 receives a new document image 224 and a document type 226 associated with the document image 224, the OCR processing engine 122 retrieves an aggregate training data set 120 associated with the document type 226. The OCR processing engine 122 is trained using the retrieved aggregate training data set 120, and then the OCR processing engine is used, as trained, to identify text in the document image 224 and to produce OCR processing results. Because the aggregate training data set 120 has been tailored for the document type 226, the results of the OCR processing of the document image 224 may be faster and more accurate than if performed after being trained using training data sets corresponding to all candidate presentation styles, or after being trained using a training data set corresponding to a single candidate presentation style.

Figure 3:
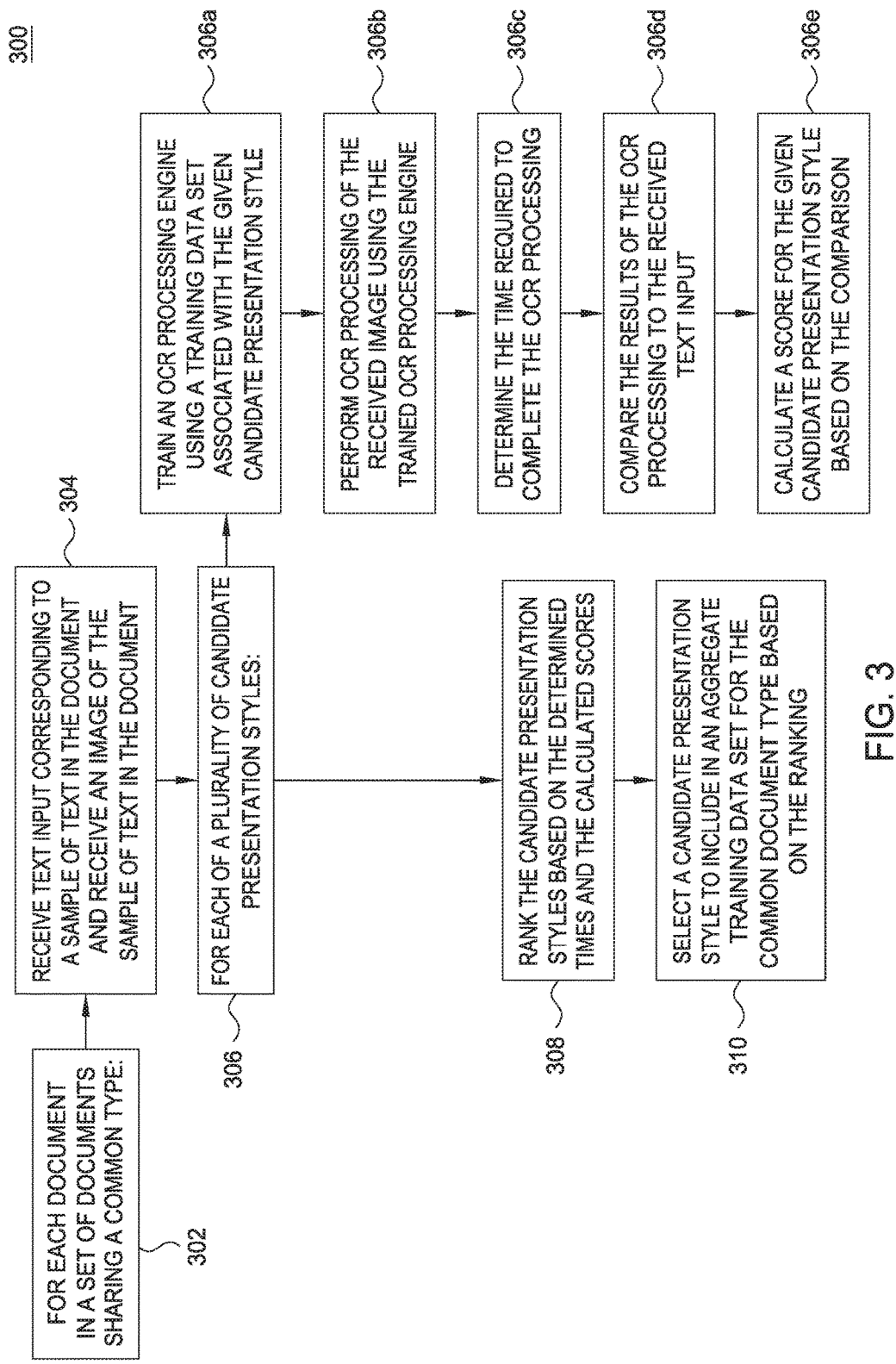
FIG. 3 illustrates a method for selecting a candidate presentation style for an individual document, according to one embodiment.

FIG. 3 illustrates a method 300 for selecting a candidate presentation style for an individual document, according to one embodiment. The method 300 begins at block 302, which indicates that all of blocks 304-310 are performed for each document in a set of documents sharing a common type. Block 304 includes receiving text input corresponding to a text sample in a document and receiving an image of the text sample in the document. The text input, or the golden text, is the actual text in a text sample found in the document. The text sample may be, for example, one or more words, or one or more lines of text found in the document. The text input may be input manually by the user, or it may be retrieved from another computing device or data storage location. The image of the document is an image that includes at least the text sample in the document. The image of the document may be uploaded by the user, or it may be retrieved from another computing device or a data storage location. Along with the text input and the image of the document, a document type associated with the document may also be received from the user, or retrieved from another computing device or data storage location.

Block 306 indicates that all of blocks 306a-306e are performed for each of a plurality of candidate presentation styles. Each candidate presentation style may correspond to a particular font and/or size of text. The plurality of candidate presentation styles may include presentation styles for which a corresponding training data set has been generated. At block 306a, for a given candidate presentation style, an OCR processing engine is trained using a training data set associated with the given candidate presentation style, and at block 306b, the trained OCR processing engine is used to identify text in the received image and to produce OCR processing results. At block 306c, the time required to complete the OCR processing is determined. For example, the time may be monitored while the OCR processing is being performed at block 306b. At block 306d, the OCR processing results are compared to the received text input. At block 306e, a score for the given candidate presentation style is calculated based on the comparison. For example, the comparison and the score calculation at blocks 306d and 306e may be performed by calculating the Levenshtein distance between the OCR processing results and the text input. The resulting Levenshtein distance may be the calculated score. However, any comparison technique to determine the differences between the OCR processing results and the text input may be used.

Once blocks 306a-306e have been performed for each candidate presentation style, each candidate presentation style has a calculated score (block 306e) and a determined time (block 306c). At block 308, the candidate presentation styles are ranked based on the determined times and the calculated scores. For example, the candidate presentation styles may be ranked from the shortest time required to perform the OCR processing to the longest time required to perform the OCR processing. In addition, if the score indicates a number of variances between the OCR processing results and the text input, as is the case with a calculated Levenshtein distance, the candidate presentation styles may be ranked from the lowest score to the highest score. In another embodiment, the candidate presentation styles may be ranked based on only one of the determined times and the calculated scores.

At block 310, a candidate presentation style for the document is selected based on the ranking at block 308. A candidate presentation style is selected to be included in an aggregate training data set for the document type associated with the document. The candidate presentation style with the lowest ranked time may be selected, and/or the candidate presentation style with the lowest ranked score may be selected. The selected candidate presentation style for the document may be categorized and stored based on the document type associated with the document. In an alternative embodiment, more than one candidate presentation style for the document may be selected at block 310.

Once a candidate presentation style for a first document is selected at block 310, the method 300 starts again at block 304 to select candidate presentation styles for the remaining documents sharing a common type with the first document. For example, the method 300 may be performed three times if three different documents are each identified by the user as a first document type. A different candidate presentation style may be selected at block 310 for each of the three different documents. As such, three different candidate presentation styles, each selected for one of three different documents, may be categorized and stored with respect to the first document type using method 300. The method 300 may be repeated for different document types. There may be any number of document types, any number of documents in a set of documents sharing a document type, and any number of candidate presentation styles.

FIG. 4 illustrates results 400 of the OCR processing, time determination, comparison, and score calculation as performed at blocks 306a-306e in method 300 for a particular document. The training data sets 110 used to perform the OCR processing are listed in the first column. The fonts 412 associated with each training data set 110 are shown in the second column, and the font sizes 414 associated with each training data set 110 are shown in the third column. The fonts 412 and font sizes 414 in each row 420 make up a single candidate presentation style corresponding to the training data set 110 in the given row 420. Each row 420 shows the OCR processing results for a given training data set 110 associated with a given candidate presentation style. For example, the first row 420 indicates that for the candidate presentation style having font "20 db" and font sizes "24.0/3.0/1.0," corresponding to training data set "20 db-24-30-1," the OCR processing took "2.04" seconds, and the calculated score was "713." If the results 400 were ranked and selected based on lowest process time 416 and/or lowest score 418, the character presentation style having the font "Cochlin-Bold" and the font size "24.0/30.0/1.0" would be selected, as it has both the lowest process time 416 and the lowest score 418.

Figure 5:
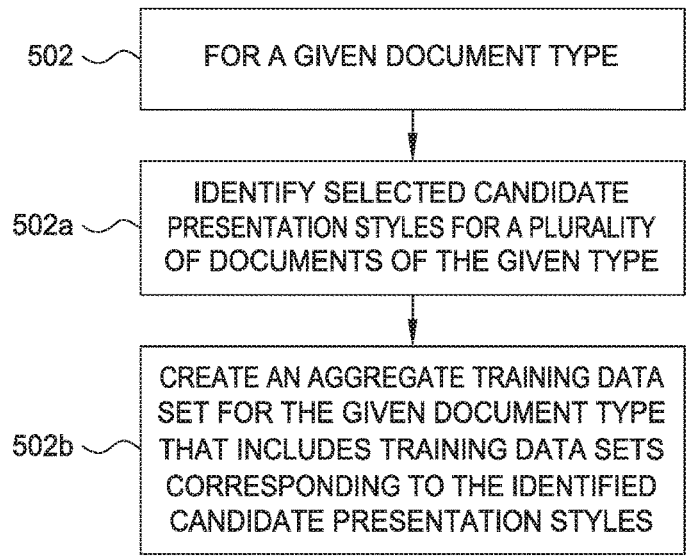
FIG. 5 illustrates a method for creating aggregate training data sets for a given document type, according to one embodiment.

FIG. 5 illustrates a method 500 for creating an aggregate training data set for a given document type, according to one embodiment. The method 500 begins at block 502 which indicates that blocks 502a and 502b are performed for a given document type. The document type could identify any type of content that is common to more than one document. For example, in one embodiment, the document type could be one of the following document types: a form, a contract, and a publication. The document type could also be more specific, such as one of the following document types: a W2 form, a lease, and a specific publication.

At block 502a, selected candidate presentation styles for a plurality of documents of the given type are identified. For example, the candidate presentation styles selected and stored for documents of the given type using method 300 may be identified. The candidate presentation styles for documents of the given type could also be input by the user. At block 502b, once candidate presentation styles for a plurality of documents of the given type are identified, an aggregate training data set for the given document type is created. The aggregate training data set is created by combining training data sets corresponding to the identified candidate presentation styles. For example, if two candidate presentation styles are identified at block 502a, the aggregate training data set created at block 502b will include a training data set corresponding to the first identified candidate presentation style and a training data set corresponding to the second identified candidate presentation style. If more than two candidate presentation styles are identified at block 502a, more training data sets corresponding to the additional identified candidate presentation styles will be included in the aggregate training data set created at block 502b. Method 500 may be repeated more than once for a given document type, and it may be repeated for a plurality of different document types, thus creating a plurality of aggregate training data sets.

Figure 6:
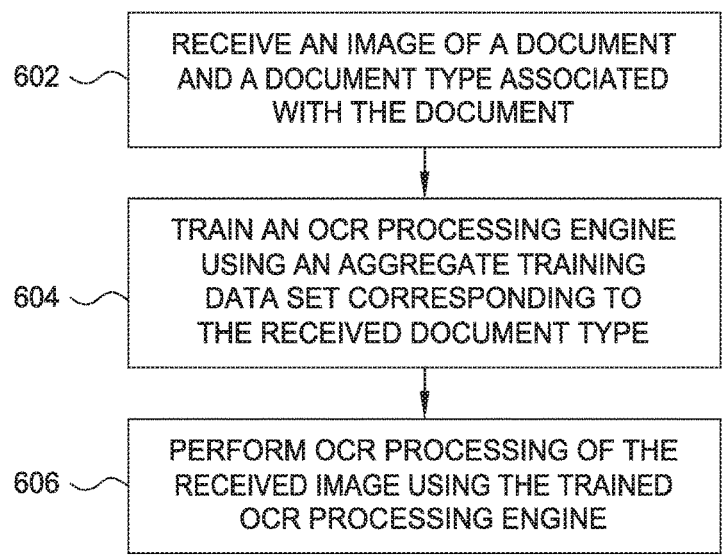
FIG. 6 illustrates a method for using an aggregate training data set to train an OCR processing engine prior to using the OCR processing engine to evaluate an image of a document in order to identify text in the image, according to one embodiment.

FIG. 6 illustrates a method 600 for using an aggregate training data set to train an OCR processing engine prior to using the OCR processing engine to evaluate an image of a document in order to identify text in the image. At block 602, an image of a document and a document type associated with the document are received. At block 604 an OCR processing engine is trained using an aggregate training data set corresponding to the received document type. For example, the aggregate training data set may have been created and stored using method 500. At block 606 OCR processing of the received image is performed to identify text in the image using the OCR processing engine trained using the aggregate training data set. Because the aggregate training data set corresponds to the particular document type, and only includes training data sets corresponding to the candidate presentation styles identified for documents of the given document type, the OCR processing could take less time and could be more accurate than if the OCR processing engine were trained with training data sets corresponding to all candidate presentation styles. Additionally, training the OCR processing engine with the aggregate training data set could allow for more accurate results than if the OCR processing engine were trained with only a single training data set corresponding to a single candidate presentation style.

Figure 7:
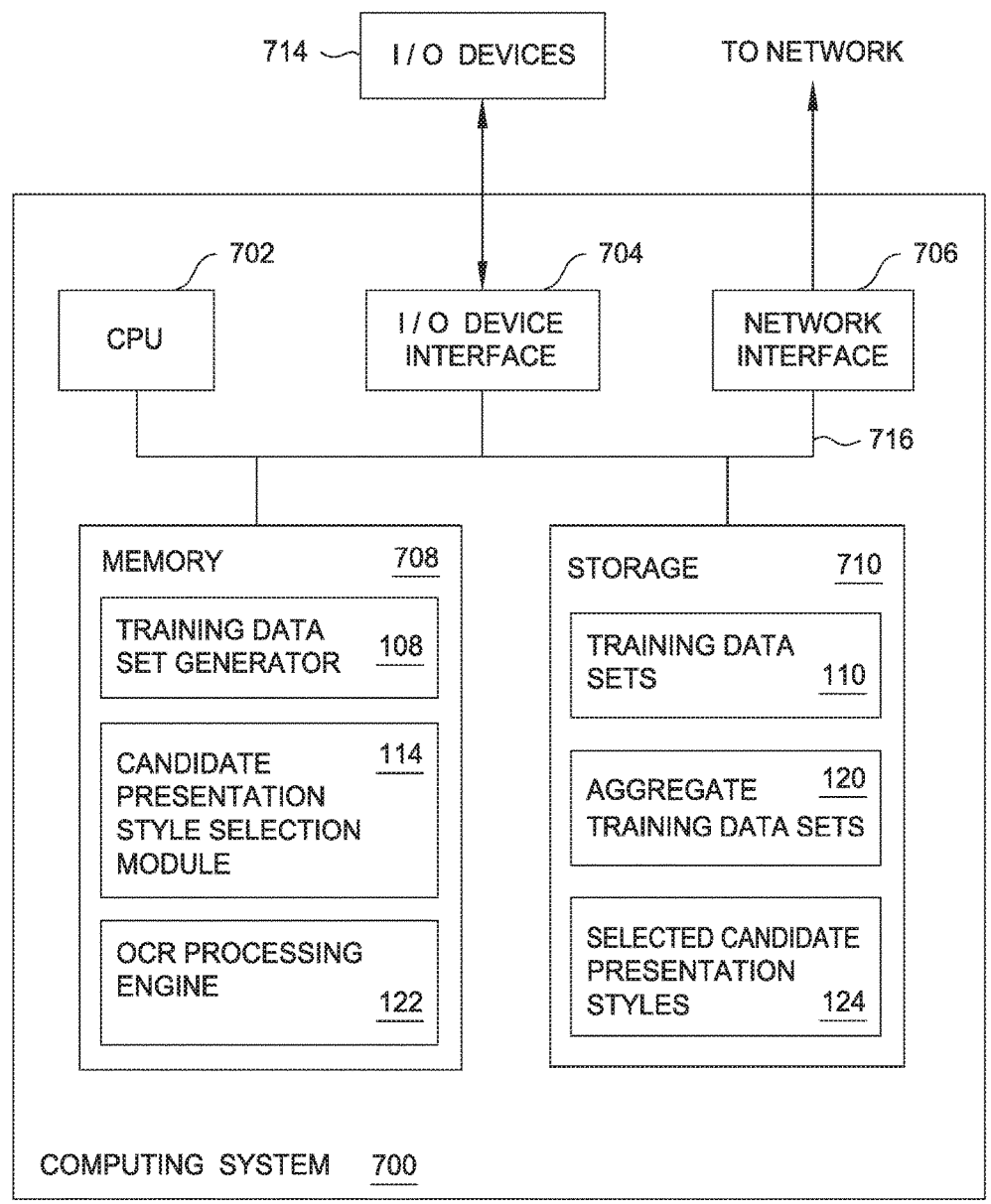
FIG. 7 illustrates an example computing system for performing techniques of the present disclosure, according to one embodiment.

FIG. 7 illustrates an example computing system 700 for performing techniques of the present disclosure, according to one embodiment. As shown, the computing system 700 includes, without limitation, a central processing unit (CPU) 702, one or more I/O device interfaces 704 which may allow for the connection of various I/O devices 714 (e.g., keyboards, displays, mouse devices, pen input, etc.) to the computing system 700, network interface 706, a memory 708, storage 710, and an interconnect 716.

CPU 702 may retrieve and execute programming instructions stored in the memory 708. Similarly, the CPU 702 may retrieve and store data residing in the storage 710. The interconnect 716 transmits programming instructions and data, among the CPU 702, I/O device interface 704, network interface 706, memory 708, and storage 710. CPU 702 can represent a single CPU, multiple CPUs, a single CPU having multiple processing cores, and the like. Additionally, the memory 708 represents random access memory. Furthermore, the storage 710 may be a disk drive. Although shown as a single unit, the storage 710 may be a combination of fixed or removable storage devices, such as fixed disc drives, removable memory cards or optical storage, network attached storage (NAS), or a storage area-network (SAN).

As shown, memory 708 includes training data set generator 108, candidate presentation style selection module 114, and OCR processing engine 122. Training data set generator 108 creates training data sets 110 and aggregate training data sets 120. Candidate presentation style selection module 114 selects a candidate presentation style for an individual document. OCR processing engine 122 identifies text in an image of a document after being trained using an aggregate training data set 120 corresponding to a document type associated with the document. Storage 610 stores training data sets 110, aggregate training data sets 120, and selected candidate presentation styles 124.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for creating an aggregate training data set corresponding to a document type, the method comprising:
   for each document of a document type in a set of documents:
      receiving the document type, wherein the document type identifies a type of content that is common to a plurality of documents of the set of documents;
      receiving input corresponding to a text sample in the document;
      receiving an image of the text sample in the document;
      for each of a plurality of candidate presentation styles:
         training an OCR processing engine using a training data set corresponding to the candidate presentation style;
         identifying text in the image of the text sample;
         producing OCR processing results for the document and the candidate presentation style using the OCR processing engine as trained;
         comparing the OCR processing results to the input corresponding to the text sample; and
         calculating a score for the candidate presentation style based on the comparison;
      ranking the candidate presentation styles based on the score calculated for each candidate presentation style;
      selecting a candidate presentation style for the document based on the ranking; and
      storing the selected candidate presentation style for the document with respect to the document type; and
   combining the training data set corresponding to the selected candidate presentation style for each document of the document type in the set of documents to create an aggregate training data set for the document type.

2. The method of claim 1, wherein the input is text in the text sample in the document.

3. The method of claim 1, further comprising: determining a time required to identify text in the image of the text sample and produce OCR processing results for each candidate presentation style.

4. The method of claim 3, wherein the candidate presentation styles are additionally ranked based on the time determined for each candidate presentation style.

5. The method of claim 1, wherein calculating a score for the candidate presentation style based on the comparison comprises: calculating a Levenshtein distance between the OCR processing results and the input corresponding to the text sample.

6. The method of claim 1, further comprising, after creating aggregate training data set for the document type:
   receiving a new image of a new document;
   receiving a new input classifying the new document as the document type;
   training the OCR processing engine using the aggregate training data set based on the document type;
   identifying text in the new image; and
   producing new OCR processing results using the OCR processing engine as trained.

7. The method of claim 1, wherein the text sample comprises one or more lines of text in the document.

8. The method of claim 1, wherein the candidate presentation styles each correspond to a text font and a text size.

9. A non-transitory computer-readable storage medium containing instructions that, when executed by one or more processors, perform an operation for creating an aggregate training data set corresponding to a document type, the operation comprising:
   for each document of a document type in a set of documents:
      receiving the document type, wherein the document type identifies a type of content that is common to a plurality of documents of the set of documents;
      receiving input corresponding to a text sample in the document;
      receiving an image of the text sample in the document;
      for each of a plurality of candidate presentation styles:
         training an OCR processing engine using a training data set corresponding to the candidate presentation style;
         identifying text in the image of the text sample;
         producing OCR processing results for the document and the candidate presentation style using the OCR processing engine as trained;
         comparing the OCR processing results to the input corresponding to the text sample; and
         calculating a score for the candidate presentation style based on the comparison;
      ranking the candidate presentation styles based on the score calculated for each candidate presentation style;
      selecting a candidate presentation style for the document based on the ranking; and
      storing the selected candidate presentation style for the document with respect to the document type; and
   combining the training data set corresponding to the selected candidate presentation style for each document of the document type in the set of documents to create an aggregate training data set for the document type.

10. The non-transitory computer-readable storage medium of claim 9, wherein the input is text in the text sample in the document.

11. The non-transitory computer-readable storage medium of claim 9, the operation further comprising: determining a time required to identify text in the image of the text sample and produce OCR processing results for each candidate presentation style.

12. The non-transitory computer-readable storage medium of claim 11, wherein the candidate presentation styles are additionally ranked based on the time determined for each candidate presentation style.

13. The non-transitory computer-readable storage medium of claim 9, wherein calculating a score for the candidate presentation style based on the comparison comprises: calculating a Levenshtein distance between the OCR processing results and the input corresponding to the text sample.

14. The non-transitory computer-readable storage medium of claim 9, the operation further comprising: after creating an the aggregate training data set for the document type: receiving a new image of a new document; receiving a new input classifying the new document as the document type; training the OCR processing engine using the aggregate training data set based on the document type; and identifying text in the new image; and producing new OCR processing results using the OCR processing engine as trained.

15. The non-transitory computer-readable storage medium of claim 9, wherein the text sample comprises one or more lines of text in the document.

16. The non-transitory computer-readable storage medium of claim 9, wherein the candidate presentation styles each correspond to a text font and a text size.

17. A system, comprising:
one or more processors; and
memory storing one or more applications, which, when executed on the one or more processors perform an operation for creating an aggregate training data set corresponding to a document type, the operation comprising:
for each document of a document type in a set of documents:
receiving the document type, wherein the document type identifies a type of content that is common to a plurality of documents of the set of documents;
receiving input corresponding to a text sample in the document;
receiving an image of the text sample in the document;
for each of a plurality of candidate presentation styles:
training an OCR processing engine using a training data set corresponding to the candidate presentation style;
identifying text in the image of the text sample;
producing OCR processing results for the document and the candidate presentation style using the OCR processing engine as trained;
comparing the OCR processing results to the input corresponding to the text sample; and
calculating a score for the candidate presentation style based on the comparison;
ranking the candidate presentation styles based on the score calculated for each candidate presentation style;
selecting a candidate presentation style for the document based on the ranking; and
storing the selected candidate presentation style for the document with respect to the document type; and
combining the training data set corresponding to the selected candidate presentation style for each document of the document type in the set of documents to create an aggregate training data set for the document type.

18. The system of claim 17, wherein the input is text in the text sample in the document.

19. The system of claim 17, the operation further comprising: determining a time required to identify text in the image of the text sample and produce OCR processing results for each candidate presentation style.

20. The system of claim 19, wherein the candidate presentation styles are additionally ranked based on the time determined for each candidate presentation style.

* * * * *